US007552400B1

(12) United States Patent  (10) Patent No.: US 7,552,400 B1
Sriver et al.  (45) Date of Patent: Jun. 23, 2009

(54) SYSTEM AND METHOD FOR NAVIGATING WITHIN A GRAPHICAL USER INTERFACE WITHOUT USING A POINTING DEVICE

(75) Inventors: Joe Sriver, Mountain View, CA (US); Bay-Wei Chang, Foster City, CA (US)

(73) Assignee: Google Inc., Mountain View, CA (US)

( * ) Notice: Subject to any disclaimer, the term of this patent is extended or adjusted under 35 U.S.C. 154(b) by 401 days.

(21) Appl. No.: 10/607,929

(22) Filed: Jun. 27, 2003

Related U.S. Application Data

(60) Provisional application No. 60/472,446, filed on May 20, 2003.

(51) Int. Cl.
*G06F 3/048* (2006.01)
(52) U.S. Cl. ...................................... 715/827
(58) Field of Classification Search .................. 715/827
See application file for complete search history.

(56) References Cited

U.S. PATENT DOCUMENTS

| 5,936,614 | A  | * | 8/1999  | An et al. ...................... 345/173 |
| 5,963,671 | A  | * | 10/1999 | Comerford et al. ........... 382/230 |
| 6,285,999 | B1 |   | 9/2001  | Page |
| 6,377,254 | B1 | * | 4/2002  | Sakaguchi ................... 715/810 |
| 6,510,458 | B1 | * | 1/2003  | Berstis et al. ................ 709/219 |
| 6,977,811 | B1 | * | 12/2005 | Fleck et al. .................. 361/686 |
| 7,188,318 | B2 | * | 3/2007  | Spisak .......................... 715/827 |
| 2002/0010932 | A1 | * | 1/2002 | Nguyen et al. ................. 725/51 |
| 2002/0070924 | A1 | * | 6/2002 | Petersen ....................... 345/172 |
| 2003/0011631 | A1 | * | 1/2003 | Halahmi ....................... 345/744 |
| 2003/0095525 | A1 | * | 5/2003 | Lavin et al. ................... 370/338 |
| 2004/0196314 | A1 | * | 10/2004 | Bhogal et al. ................ 345/780 |

OTHER PUBLICATIONS

Screen Dumps of Microsoft Internet Explorer 6.0 (1999, pp. 1-10).*

* cited by examiner

*Primary Examiner*—David A. Wiley
*Assistant Examiner*—Le Nguyen
(74) *Attorney, Agent, or Firm*—Blakely, Sokoloff, Taylor & Zafman LLP

(57) ABSTRACT

A system and method for navigating within a graphical user interface without using a pointing device is described. A set of one or more keyboard shortcuts is defined, including at least one key. Each keyboard shortcut specifies an action effecting a graphical user interface, which is executed upon input of each key in the keyboard shortcut and at least one key corresponding to a semantically-meaningful hyperlink within Web content. The graphical user interface is navigated. The Web content is provided on a view within the graphical user interface and a graphical pointer indicating a location within the view is included. At least one key input by a user is intercepted and the intercepted key to one such keyboard shortcut is mapped. The action specified by the keyboard shortcut is executed and the view within the Web content is updated relative to the graphical pointer.

38 Claims, 13 Drawing Sheets

41

42

43

44

45

46

47

48

SYSTEM AND METHOD FOR NAVIGATING WITHIN A GRAPHICAL USER INTERFACE WITHOUT USING A POINTING DEVICE

CROSS-REFERENCE TO RELATED APPLICATION

This non-provisional patent application claims priority under 35 USC § 119(e) to U.S. provisional patent application Ser. No. 60/472,446, filed May 20, 2003, the disclosure of which is incorporated by reference.

FIELD OF THE INVENTION

The present invention relates in general to graphical user interface operation and, in particular, to a system and method for navigating within a graphical user interface without using a pointing device.

BACKGROUND OF THE INVENTION

Although the Internet traces back to the late 1960s, the widespread availability and acceptance of personal computing and internetworking have resulted in the explosive growth and unprecedented advances in information sharing technologies. In particular, the Worldwide Web ("Web") has revolutionized accessibility to untold volumes of information in stored electronic form to a worldwide audience, including written, spoken (audio) and visual (imagery and video) information, both in archived and real-time formats. In short, the Web has provided desktop access to every connected user to a virtually unlimited library of information in almost every language worldwide.

Information exchange on the Web operates under a client-server model. Individual clients execute Web content retrieval and presentation applications, typically in the form of Web browsers. The Web browsers send request messages for Web content to centralized Web servers, which function as data storage and retrieval repositories. The Web servers parse the request messages and return the requested Web content in response messages.

A typical search query scenario begins with either a natural language question or individual keywords submitted to a search engine. The search engine executes a search against a data repository describing information characteristics of potentially retrievable Web content and identifies the candidate Web pages. Searches can often return thousands or even millions of results, so most search engines typically rank or score only a subset of the most promising results. The top Web pages are then presented to the user, usually in the form of Web content titles, hyperlinks, and other descriptive information, such as snippets of text taken from the Web pages.

Generally, Web browsers must be capable of presenting Web content provided in multiple divergent formats, including plain and formatted text, images, audio, and video and received in stored, static or live, dynamic forms. As a result, Web browsers are typically implemented with a graphical user interface to enable flexible presentation of visual content and to provide intuitive user interfacing controls. Visual Web content is output within a display area defined on the graphical user interface while user inputs are generally input both within the display area and within specified user input regions. The user input regions non-exclusively include text boxes, radio buttons, pull down menus, and popup dialog boxes. User inputs can consist of typed text, clicks, or both.

To accommodate both forms of user inputs, graphical user interfaces, including Web browser graphical user interfaces, generally require a pointing device, such as a mouse, trackball, track pad, or arrow keys. Pointing devices operate either in combination with or as a replacement for a keyboard. The graphical user interface generates an arrow or similar graphical pointer or cursor, which is logically coupled to a pointing device. The graphical pointer has a fixed or dynamically defined shape. To navigate, users move the pointing device, which the pointing device translates into linear movement of the graphical pointer. To input a selection, users toggle or "click" one or more buttons linked to the pointing device when the pointing device is proximal to the desired item.

Although intuitive to use, pointing devices suffer from several drawbacks. First, pointing devices must be physically available. However, older legacy computer systems may lack a pointing device, or may have an incompatible pointing device. Similarly, the pointing device may be lost, missing or broken. Alternatively, the user may suffer physical handicaps, which preclude the use of a pointing device, or the user may simply prefer using a keyboard exclusively.

Second, pointing devices can encumber efficient input. Pointing devices are typically devices physically separate from the keyboard. Operating a pointing device requires a user to displace one or both hands from the keyboard, thereby requiring a new "home row" orientation upon the completion of pointing device operations. As well, pointing devices require coordinated visual tracking of the graphical pointers, which can be difficult for some users to see if, for example, the user is far sighted or color blind.

Accordingly, there is a need to provide an approach to providing a keyboard-based graphical user interface navigational methodology. Preferably, such an approach would operate with legacy or other computer systems lacking pointing devices.

Accordingly, there is a further need to provide an approach to navigating within a graphical user interface without a pointing device. Preferably, such an approach would provide navigation within both display areas and specified user input regions and be capable of providing non-navigational functionality.

SUMMARY OF THE INVENTION

An embodiment provides a system and method for navigating within a graphical user interface without using a pointing device. A set of one or more keyboard shortcuts is defined, including at least one key. Each keyboard shortcut specifies an action effecting a graphical user interface, which is executed upon input of each key in the keyboard shortcut and at least one key corresponding to a semantically-meaningful hyperlink within Web content. The graphical user interface is navigated. The Web content is provided on a view within the graphical user interface and a graphical pointer indicating a location within the view is included. At least one key input by a user is intercepted and the intercepted key to one such keyboard shortcut is mapped. The action specified by the keyboard shortcut is executed and the view within the Web content is updated relative to the graphical pointer.

A further embodiment provides providing keyboard-based graphical user interface navigation. A graphical user interface is provided, including an output area displaying Web content and a user input region receiving user keyboard inputs. A set of one or more keyboard shortcuts is defined, including at least one key available on a keyboard communicatively interfaced to the graphical user interface and at least one key corresponding to a semantically-meaningful hyperlink within the Web content. Each keyboard shortcut specifies an action effecting the graphical user interface, which is executed upon input of each key in the keyboard shortcut. Keyboard shortcuts received from a user to navigate within the output area of the graphical user interface are intercepted. The Web content is provided on a view within the output area of the graphical user interface. A graphical pointer navigable within the output area is maintained and a location within the view of the Web content is indicated. At least one key input by a user is intercepted and the intercepted key is mapped to one such keyboard shortcut. The action specified by the keyboard shortcut is executed and the view within the Web content is updated relative to the graphical pointer.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

The patent or application file contains at least one drawing executed in color. Copies of this patent or patent application publication with the color drawings will be provided by the Office upon request and payment of the necessary fee.

DETAILED DESCRIPTION

System Overview

Figure 1:
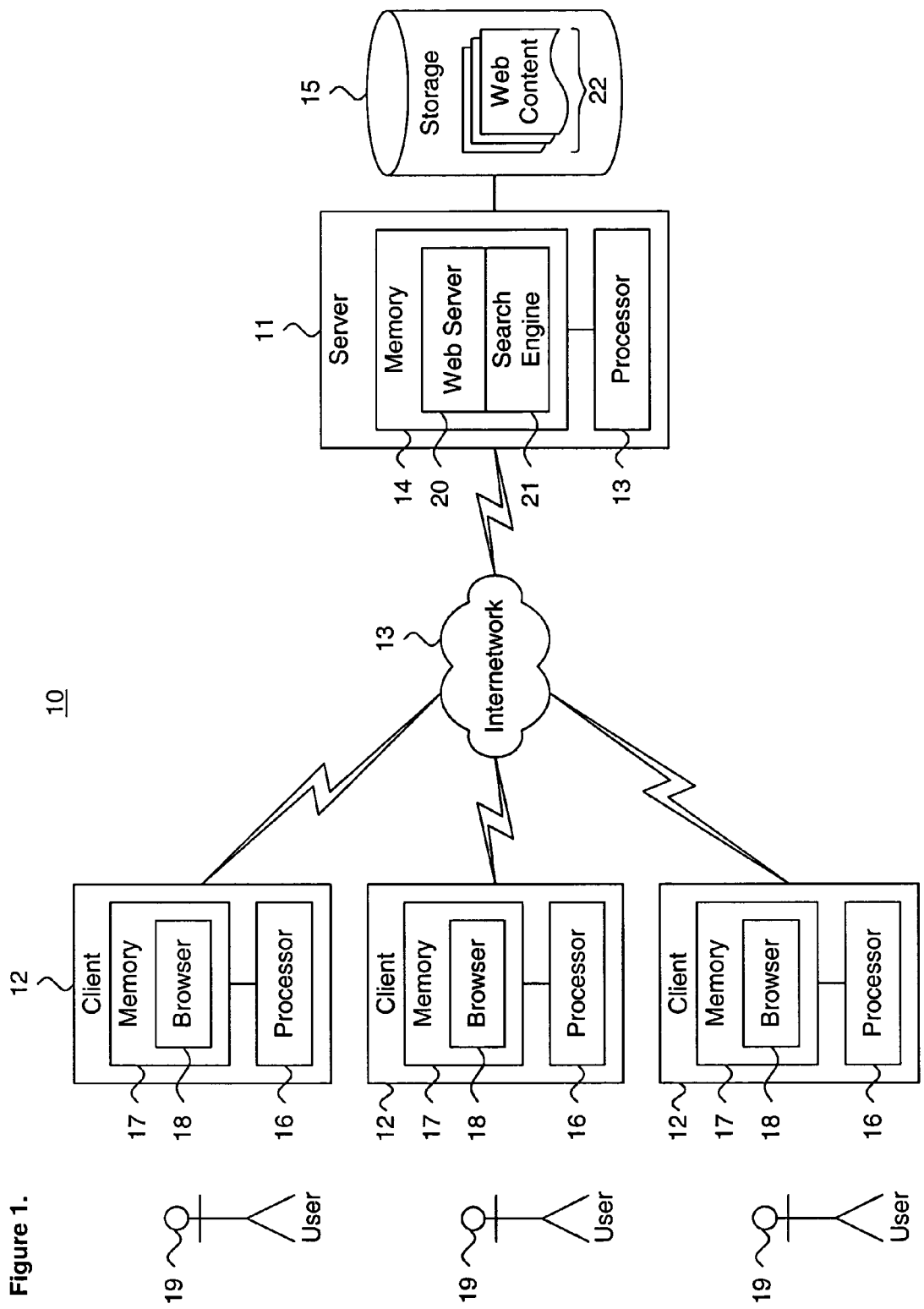
FIG. 1 is a block diagram showing a system for navigating within a graphical user interface without using a pointing device, in accordance with the present invention.

FIG. 1 is a block diagram showing a system 10 for navigating within a graphical user interface without using a pointing device, in accordance with the present invention. A plurality of individual clients 12 are communicatively interfaced to a server 11 via an internetwork 13, such as the Internet, or other form of communications network, as would be recognized by one skilled in the art. The individual clients 12 are operated by users 19 who transact requests for Web content and other operations through their respective client 12.

In general, each client 12 can be any form of computing platform connectable to a network, such as the internetwork 13, and capable of interacting with application programs. Exemplary examples of individual clients include, without limitation, personal computers, digital assistances, "smart" cellular telephones and pagers, lightweight clients, workstations, "dumb" terminals interfaced to an application server, and various arrangements and configurations thereof, as would be recognized by one skilled in the art. The internetwork 13 includes various topologies, configurations, and arrangements of network interconnectivity components arranged to interoperatively couple with enterprise, wide area and local area networks and include, without limitation, conventionally wired, wireless, satellite, optical, and equivalent network technologies, as would be recognized by one skilled in the art.

For Web content exchange and, in particular, to transact searches, each client 12 executes a Web browser 18 ("Web browser"), which implements a graphical user interface and through which search queries are sent to a Web server 20 executing on the server 11, as further described below with reference to FIG. 2. Each search query describes or identifies information, generally in the form of Web content, which is potentially retrievable via the Web server 20. The search query provides characteristics, typically expressed as terms, such as keywords and the like, and attributes, such as language, character encoding and so forth, which enables a search engine 21, also executing on the server 11, to identify and send back Web pages. The terms and attributes are a form of metadata, which constitute data describing data. Other styles, forms or definitions of search queries, search query characteristics, and metadata are feasible, as would be recognized by one skilled in the art.

The Web pages are sent back to the Web browser 18 for presentation, usually in the form of Web content titles, hyperlinks, and other descriptive information, such as snippets of text taken from the Web pages. The user can view or access the Web pages on the graphical user interface and can input selections and responses in the form of typed text, clicks, or both. The server 11 maintains an attached storage device 15 in which Web content 22 is maintained. The Web content 22 could also be maintained remotely on other Web servers (not shown) interconnected either directly or indirectly via the internetwork 13 and which are preferably accessible by each client 12.

The search engine 21 firmly identified as the Web content 22 best matching the search query terms provide high-quality webpages, such as described in S. Brin and L. Page, "the anatomy of a large-scale hypertextual search engine" (1998) and in U.S. Pat. No. 6,285,999, issued Sep. 4, 2001 to Page, the disclosures of which are incorporated by reference. In identifying matching Web content 22, the search engine 21 operates on information characteristics describing potentially retrievable Web content, as further described below with reference to FIG. 2. Note the functionality provided by the server 11, including the Web server 20 and search engine 21, to be provided by a loosely- or tightly-coupled distributed or parallelized computing configuration, in addition to a uniprocessing environment.

The individual computer systems, including server 11 and clients 12, include general purpose, programmed digital computing devices consisting of a central processing unit (processors 13 and 16, respectively), random access memory (memories 14 and 17, respectively), non-volatile secondary storage 15, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage. The Web browser 18 is an HTTP-compatible Web browser, such as the Internet Explorer, licensed by Microsoft Corporation, Redmond, Wash.; Navigator, licensed by Netscape Corporation, Mountain View, Calif.; or a Mozilla or JavaScript enabled browser, as are known in the art.

Computer System Components

Figure 2:
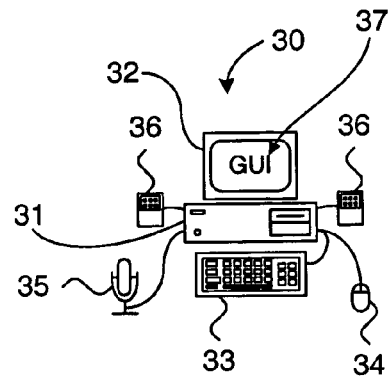
FIG. 2 is a block diagram showing a computer system for use in the system of FIG. 1.

FIG. 2 is a block diagram showing a computer system 30 for use in the system 10 of FIG. 1. The computer system 30 includes a processor 31 and visual display 32, such as a computer monitor or liquid crystal diode (LCD) display, as are known in the art. The computer system 30 executes a Web browser 18 (shown in FIG. 1), which implements a graphical user interface 37. The graphical user interface 37 is navigated and operated by using keyboard shortcuts, which are intercepted and executed by the Web browser 18, or equivalent component, as further described below with reference to FIGS. 3A-H. Visual Web content is output within a display area defined on the graphical user interface 37 while user inputs are generally input both within the display area and within specified user input regions. Textual user inputs are received via a keyboard 33. Linear, non-textual inputs are received via an optional pointing device 34, such as a mouse, trackball, track pad, or arrow keys. Similarly, voice- and sound-based inputs are received via a microphone 35. Visual outputs are displayed via the graphical user interface 37 on the visual display 32, while audio outputs are played on the speakers 36. Other forms of computer components, including processor 31, visual display 32, and input and output devices could be used, as would be recognized by one skilled in the art.

Keyboard Layouts

FIGS. 3A-H are functional block diagrams showing keyboard layouts for navigating within a graphical user interface 37. Briefly, each keyboard layout defines a set of keyboard shortcuts for the keyboard 33, which can be used to navigate and operate within the graphical user interface 37 without using a pointing device 34. Each keyboard shortcut specifics an action affecting the graphical user interface 37, which is executed by the Web browser 18, upon input of each key in the keyboard shortcut. A pointing device 34 could be used in conjunction with the keyboard 33, but the pointing device 34 is not mandatory.

In the described embodiment, the keyboard shortcuts are generated for selected hyperlinks within each Web page. Preferably, semantically-meaningful hyperlinks are selected, rather than selecting each hyperlink in spatial or source order. Intervening hyperlinks may therefore be skipped. The selection of semantically-meaningful hyperlinks is based on an evaluation of each Web page using semantic analysis methodologies, as is known in the art. For instance, in a Web page providing a listing of search results, a hyperlink corresponding to each successive search result may be selected. Similarly, in a Web page providing a listing or clusters of information, for example, a list of projects, a hyperlink corresponding to each successive listing or cluster, such as, successive projects, may be selected.

During execution, the Web browser 18 provides Web content in a view on the graphical user interface 37, including a graphical pointer indicating a location within the view. The Web browser 18 intercepts input keys received via the keyboard 33 and maps recognized input keys to a keyboard shortcut. Each keyboard shortcut is executed and causes view in the graphical user interface 37 to be updated, as further described below with reference to FIG. 13. Updating of the graphical user interface 37 includes automatically scrolling the view in the Web browser to the selection. The keyboard layouts are logically organized to provide navigational and non-navigational functionality.

Figure 3A:
FIGS. 3A-H are functional block diagrams showing keyboard layouts for navigating within a graphical user interface.
Figure 3B:

Referring first to FIG. 3A, a keyboard layout 41 consisting of a navigation group for navigating a selection within a Web page is shown. By way of example, four keys are used to navigate a selection within the Web page: the 'J' key moves the selection left, the 'L' key moves the selection right, the 'I' key moves the selection up, and the 'K' key moves the selection down. The view of the Web page is updated relative to the graphical pointer by jumping or scrolling the Web page in the direction indicated by the key selected. Other keyboard shortcut layouts for navigating a selection within a Web page could be used, as would be recognized by one skilled in the art.

In the described embodiment, movement navigated to a selection within a Web page is accompanied by variable speed scrolling. Rather than jumping to the selection, the Web browser initially scrolls the Web page quickly and then scrolls the Web page slowly into the final scroll position. Thus, the Web browser provides the appearance of "slow-in," "slow-out" scrolling. In addition, repeatedly striking either the 'I' key or 'K' key, for example, also scrolls the Web page until the end of the Web page is reached. Upon reaching end of the Web page, striking either the 'I' key or 'K' key will cause the Web browser to fetch the next page of search results, thereby enabling the user to continue scanning search results without having to use a pointing device. Other forms of scrolling, including variable and fixed speeds and combinations of jumping and scrolling are possible, as would be recognized by one skilled in the art.

Referring next to FIG. 3 being, a keyboard layout 42 consisting of a retrieval group for accessing or visiting a particular webpages shown to a way of example, the 'enter' key is used to access or visit a particular webpage. Typing the enter key causes the Web browser 18 to retrieve the webpage identified by the selection, such as via the navigational keyboard shortcuts 41, described below with reference to FIG. 3A. Other key road layouts for accessing or visiting a particular webpage could be used, as would be recognized by one skilled in the art.

Figure 3C:
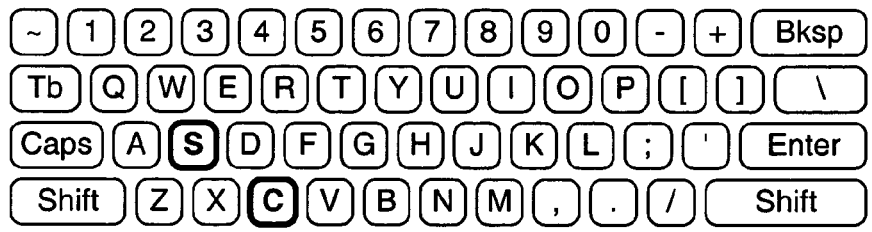

Referring next to FIG. 3C, a keyboard layout 43 consisting of a caching group for accessing cached or similar Web pages is shown. Note the cached or similar Web pages must be supported and provided by the search engine 21. By way of example, two keys are used to access cached or similar Web pages: the 'C' key accesses cached Web pages and the 'S' key accesses similar Web pages. Other keyboard layouts for accessing cached or similar Web pages could be used, as would be recognized by one skilled in the art.

Figure 3D:
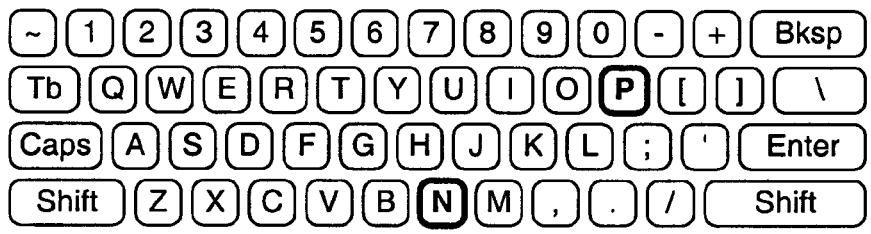

Referring next to FIG. 3D, a keyboard layout 44 consisting of a sequence group for accessing next and previous Web pages in a sequence or list, such as the next and previous Web pages in a list of Web pages, is shown. By way of example, two keys are used to access next and previous Web pages in a list: the 'N' key accesses the next Web page in the list and the 'P' key accesses the previous Web page in the list. Alternatively, the 'K' and 'I' keys could respectively be used to move past the last or first Web page in a list. Other keyboard layouts for accessing the next and previous Web pages in a list could be used, as would be recognized by one skilled in the art.

Figure 3E:
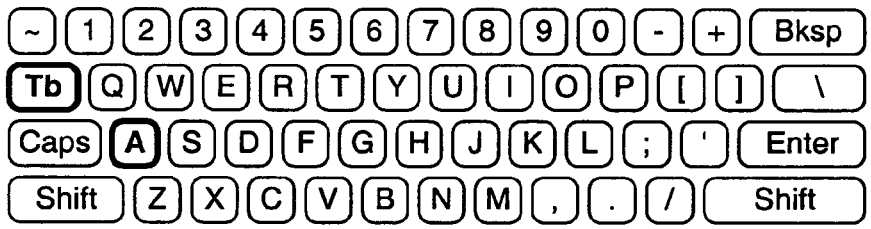

Referring next to FIG. 3E, a keyboard layout 45 consisting of a focus group for moving the focus to a search box is shown. By way of example, the 'A' key is used to move the focus to a search box and the 'Tab' ("Tb") key is used to move the focus back from the search box. The search box is used to enter textual user inputs and could be any other form of textual user input entry region within the graphical user interface 37, including other forms of text boxes, as would be recognized by one skilled in the art. Other keyboard layouts for moving the focus to a search box could be used, as would be recognized by one skilled in the art.

Figure 3F:
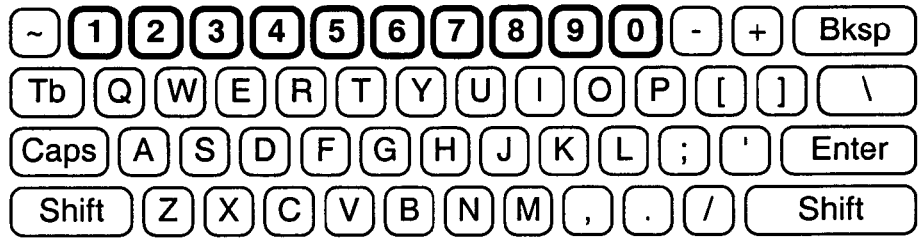

Referring next to FIG. 3F, a keyboard layout 46 consisting of an enumerated group for accessing or visiting an enumerated Web page, such as a Web page selected from a list of Web pages, is shown. By way of example, the number keys are used to access Web pages: the '1' key accesses the first Web page, the '1' key accesses the second Web page, and so on. The '0' key accesses the tenth Web page. Typing one of the number keys causes the Web browser 18 to retrieve the specific Web page enumerated in a list of Web pages. Other keyboard layouts for accessing or visiting an enumerated Web page could be used, as would be recognized by one skilled in the art.

Figure 3G:

Referring next to FIG. 3G, a keyboard layout 47 consisting of a hierarchy group for accessing a previous Web page in a hierarchy is shown. By way of example, the 'Backspace' ("Bksp") key is used to access the previous Web page. Typing the 'Backspace' key causes the Web browser 18 to retrieve the Web page previous to the current Web page. Other keyboard layouts for accessing a previous Web page could be used, as would be recognized by one skilled in the art.

Figure 3H:

Referring next to FIG. 3H, a keyboard layout 48 consisting of a help group for accessing a help sheet is shown. By way of example, two keys are used to access the help sheet: the '/' key and the '?' key (not shown) both access a help sheet, which lists the available keyboard shortcuts. Other keyboard layouts for accessing a help sheet could be used, as would be recognized by one skilled in the art.

In a further embodiment, a toolbar is provided as part of the presentation of a Web page on the graphical user interface 37. The toolbar can be in the form of a client-side application, as is known in the art. Keyboard shortcuts may be accessed by toggling a specified key, such as the 'Control' key. Typing the specified key causes the Web browser 18 to label each hyperlink or selected hyperlink within the displayed Web page with an indicator corresponding to a key on the keyboard. For instance, each hyperlink could be labeled with an upper case letter, such as 'A,' 'B,' 'C,' and so forth. Subsequently typing one of the indicated keys causes the Web browser 18 navigate to the associated hyperlink.

Web Pages

Figure 4:
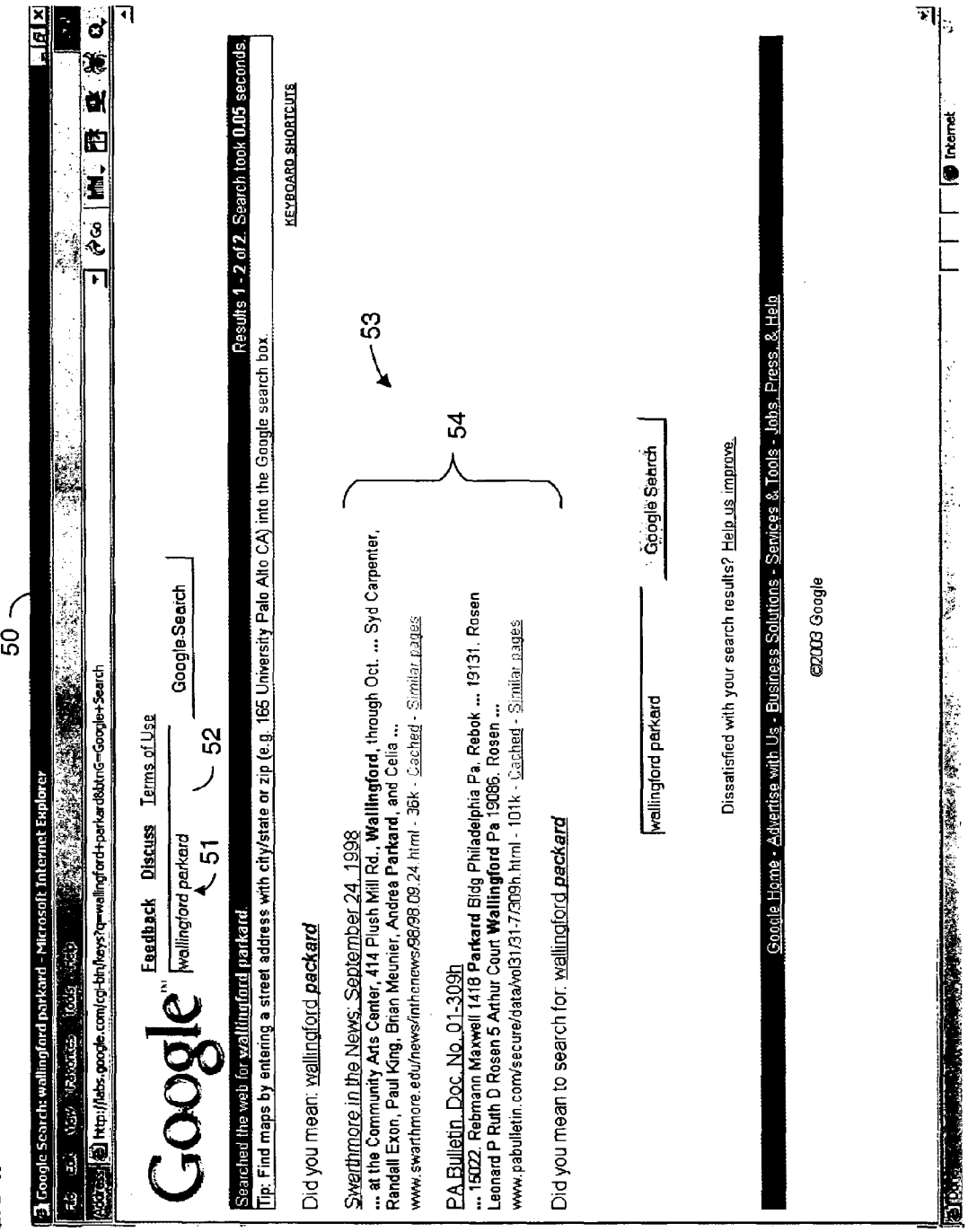
FIG. 4 is a screen shot showing, by way of example, Web pages presented in a tabular fashion.

FIG. 4 is a screen shot 50 showing, by way of example, Web pages 53 presented in a tabular fashion. The Web pages 54 are generated by the search engine 21 (shown in FIG. 1) based on an illustrative textual query, "wallingford parkard," displayed in a search box 52. Each of the Web pages 54 are listed with one or more navigable hyperlinks on a tabular Web page 53.

Selection of First Web page

Figure 5:
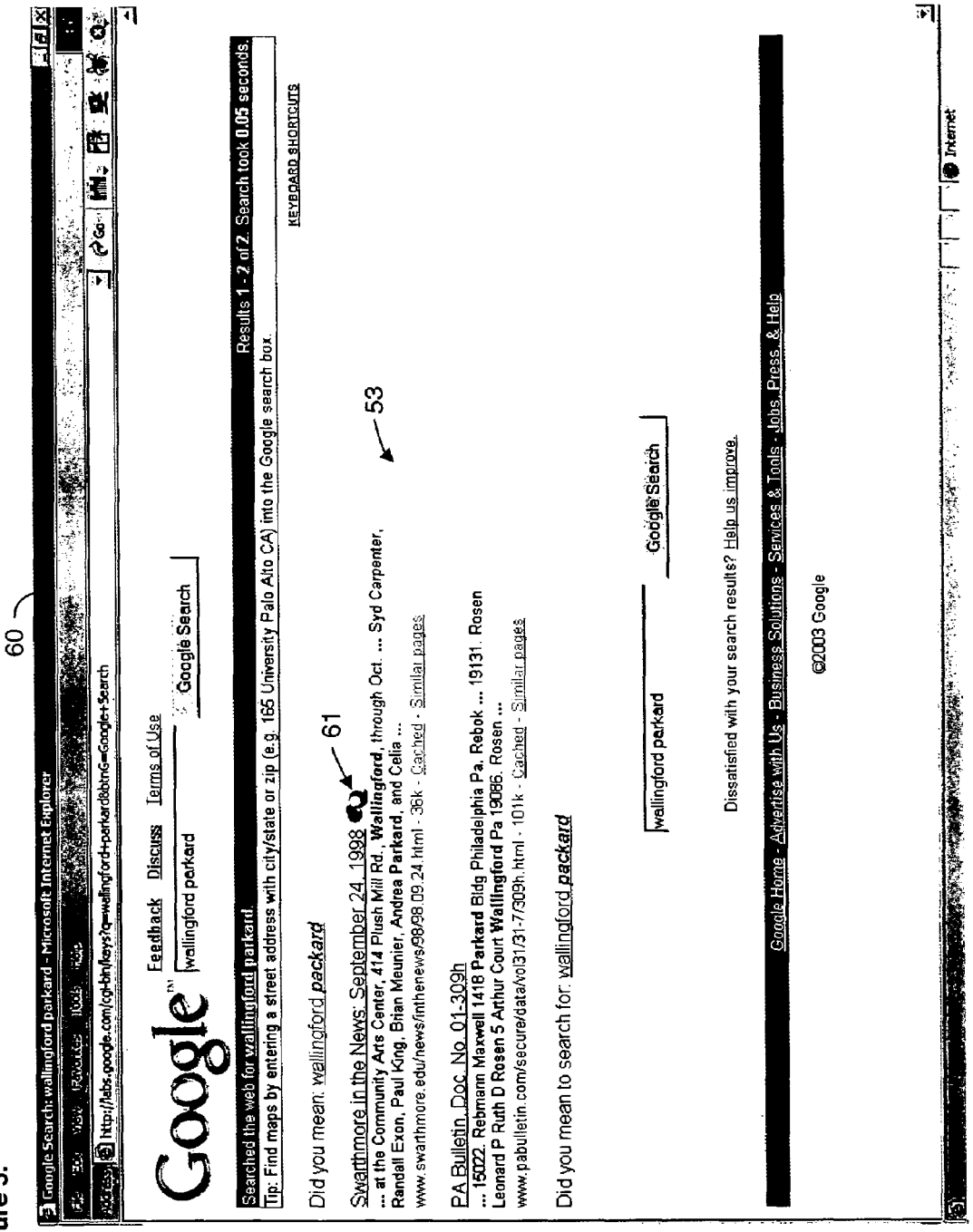
FIG. 5 is a screen shot showing, by way of example, selection of a first Web page.

FIG. 5 is a screen shot 60 showing, by way of example, selection of a first Web page 61. A special indicator, or similar form of highlighting, identifies the selection of the first Web page 61. In the described embodiment, the first Web page 61 is selected by default when any key on the keyboard 33 is pressed when viewing the tabular Web page 53, described above with reference to FIG. 4.

Selection of Further Web Page

Figure 6:
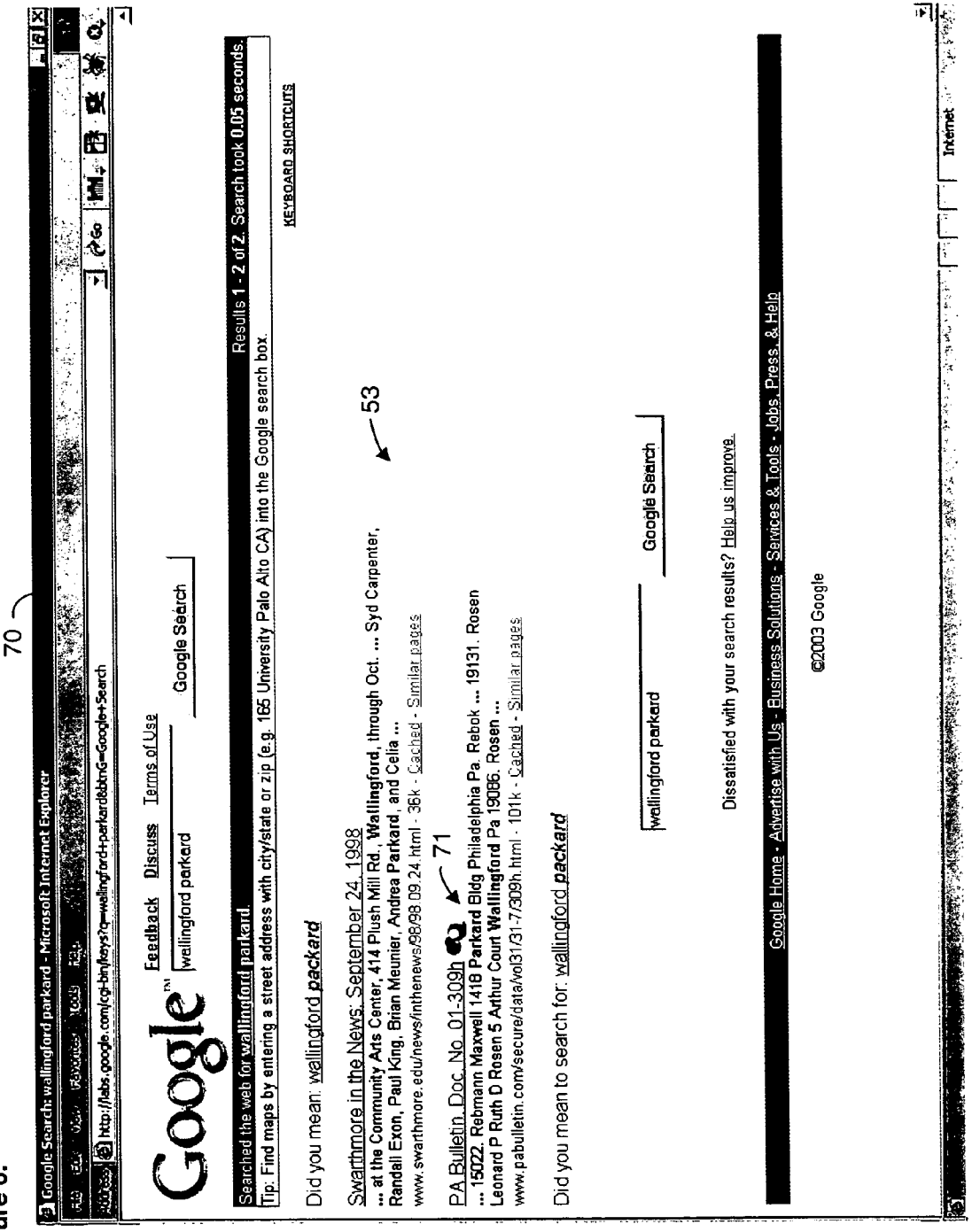
FIG. 6 is a screen shot showing, by way of example, selection of a further Web page.

FIG. 6 is a screen shot 70 showing, by way of example, selection of a further Web page 71. As above, the special indicator, or similar form of highlighting, identifies the selection of the further Web page 71. In the described embodiment, the further Web page 71 is selected when the 'K' key on the keyboard 33 is pressed when viewing the tabular Web page 53, described above with reference to FIG. 5.

Web Page Retrieval

Figure 7:
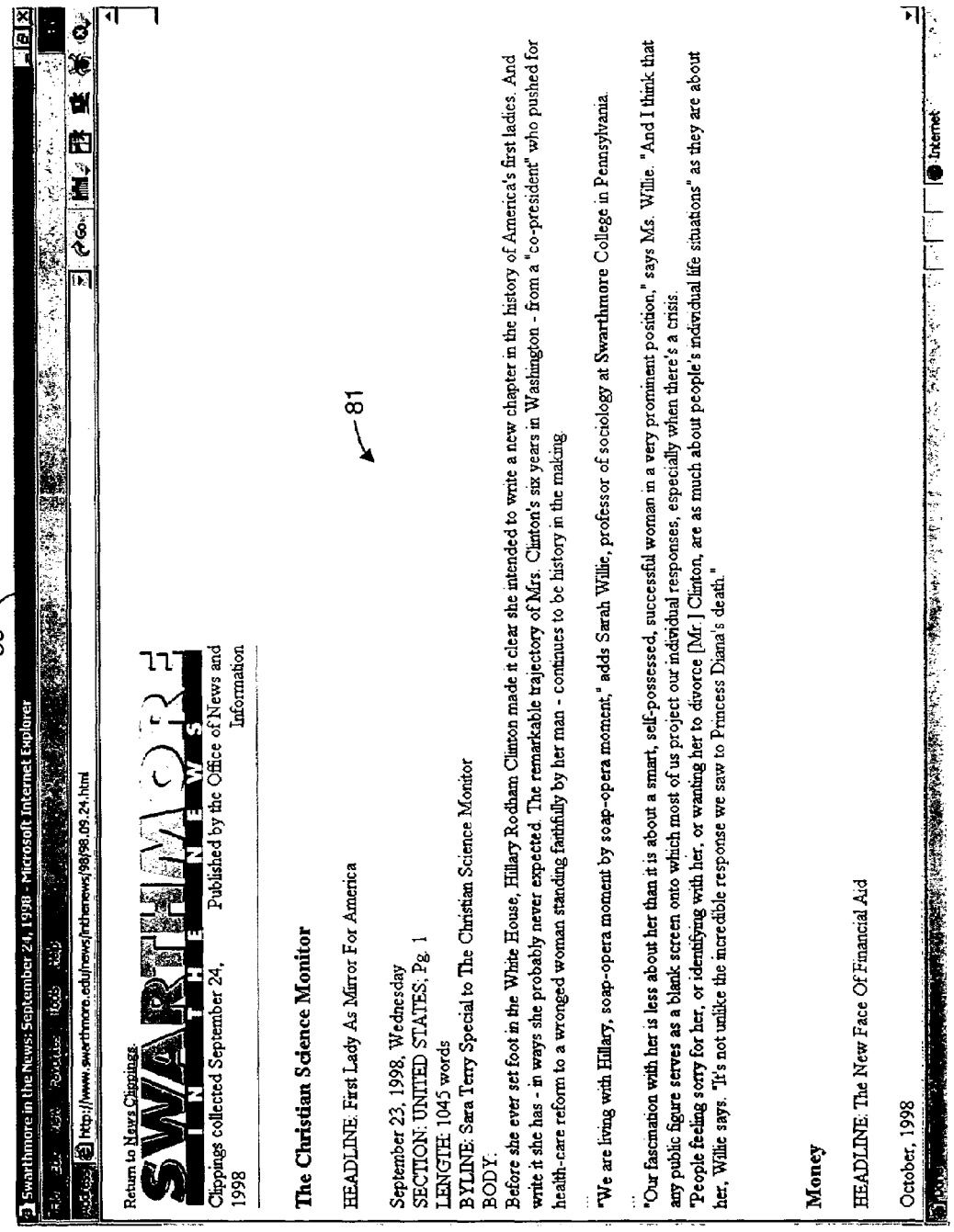
FIG. 7 is a screen shot showing, by way of example, the first Web page selected.

FIG. 7 is a screen shot 80 showing, by way of example, retrieval of the first Web page 81. In the described embodiment, the first Web page 81 is retrieved when the 'Enter' key on the keyboard 33 is pressed when viewing the tabular Web page 53, described above with reference to FIG. 5.

Cached Copy

Figure 8:
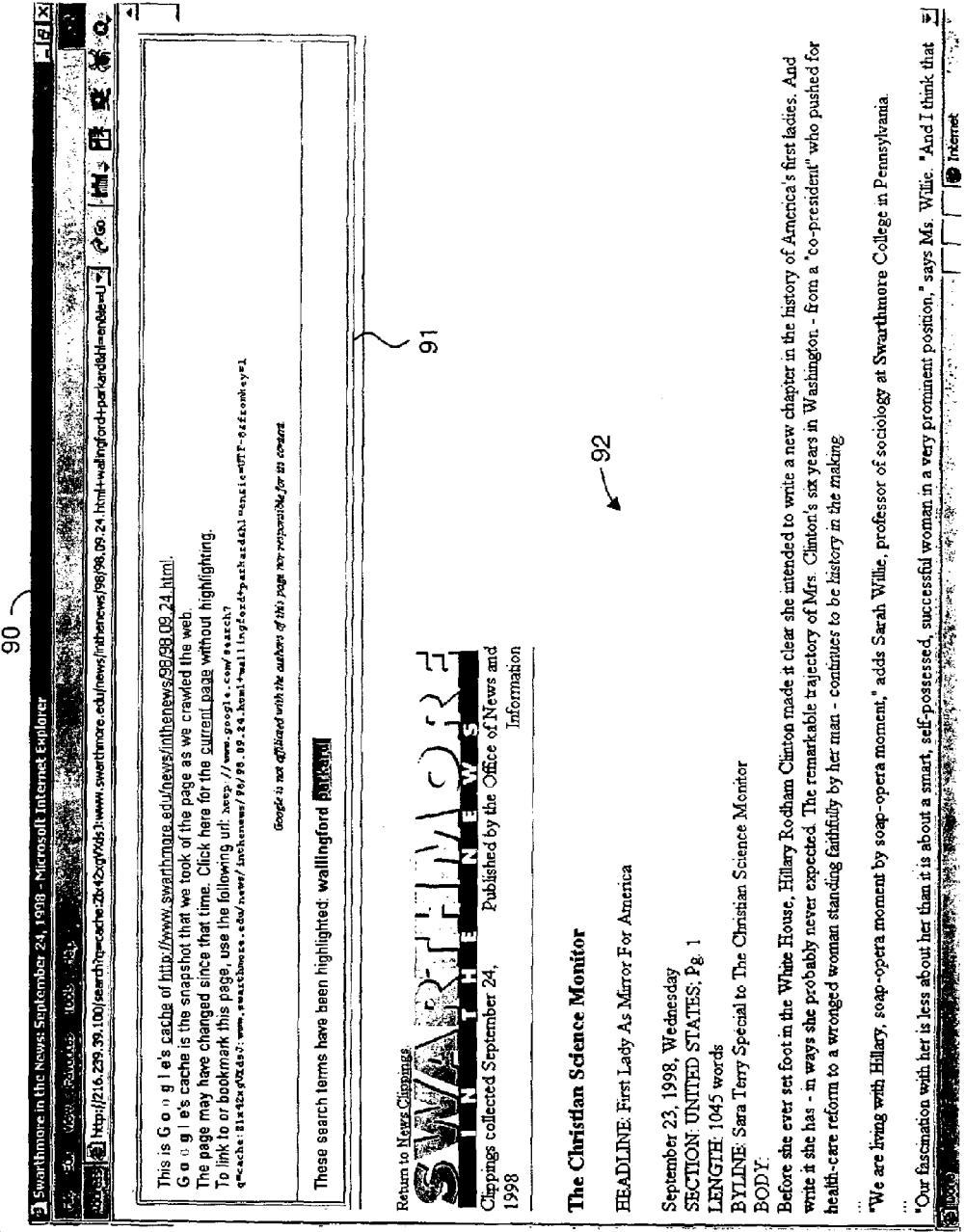
FIG. 8 is a screen shot showing, by way of example, a cached copy of the first Web page selected.

FIG. 8 is a screen shot 90 showing, by way of example, a cached copy 92 of the first Web page selected 61. An informational box 91 describes the cached copy 92. Note the cached copy 92 must be supported and provided by the search engine 21. In the described embodiment, the cached copy 92 is selected when the 'C' key on the keyboard 33 is pressed when viewing the tabular Web page 53, described above with reference to FIG. 5.

Similar Pages

Figure 9:
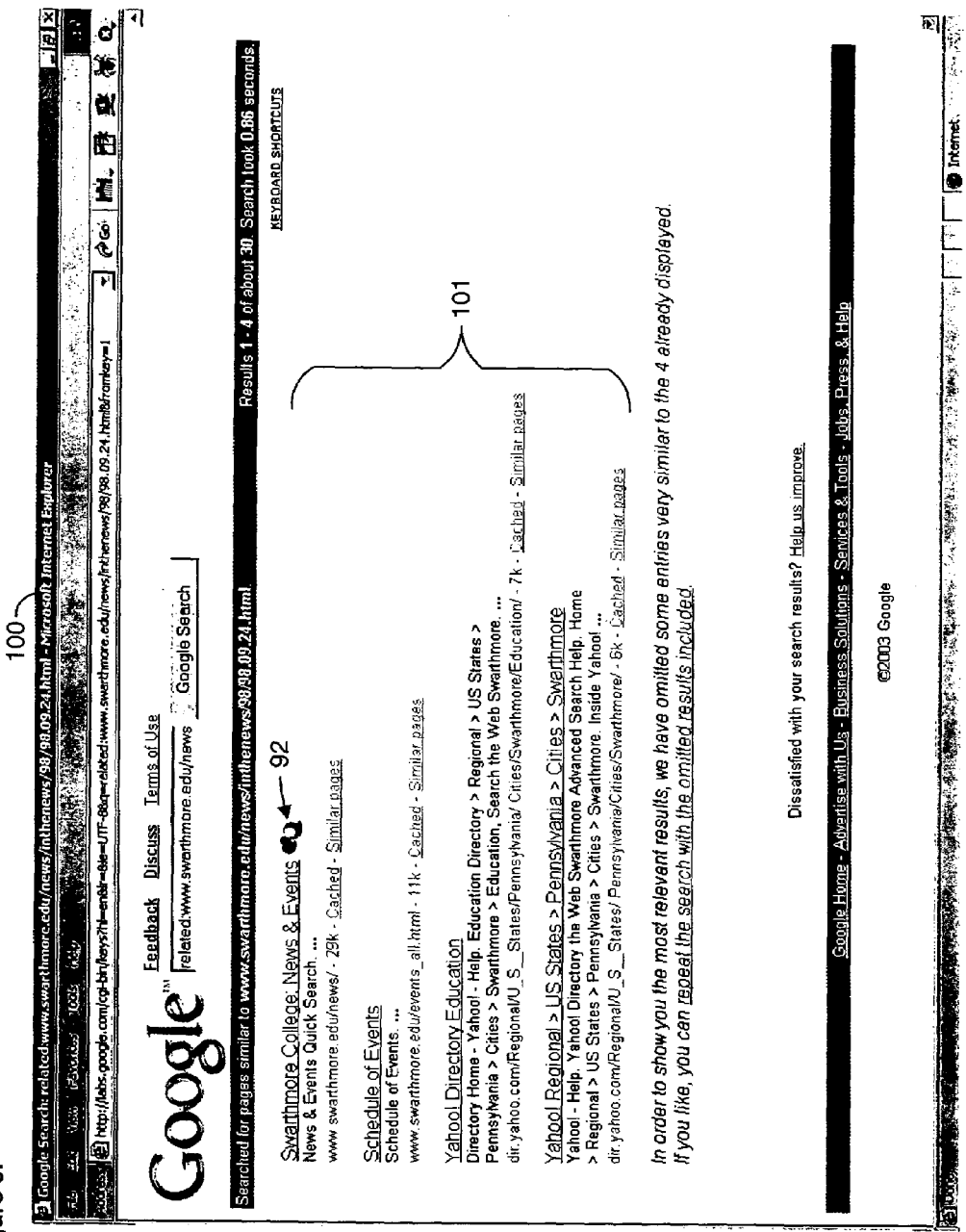
FIG. 9 is a screen shot showing, by way of example, Web pages similar to the first Web page selected.

FIG. 9 is a screen shot 100 showing, by way of example, Web pages 101 similar to the first Web page selected 61. Note the similar pages 101 must be supported and provided by the search engine 21. In the described embodiment, the similar pages 101 are selected when the 'S' key on the keyboard 33 is pressed when viewing the tabular Web page 53, described above with reference to FIG. 5.

Search Box Focus

Figure 10:
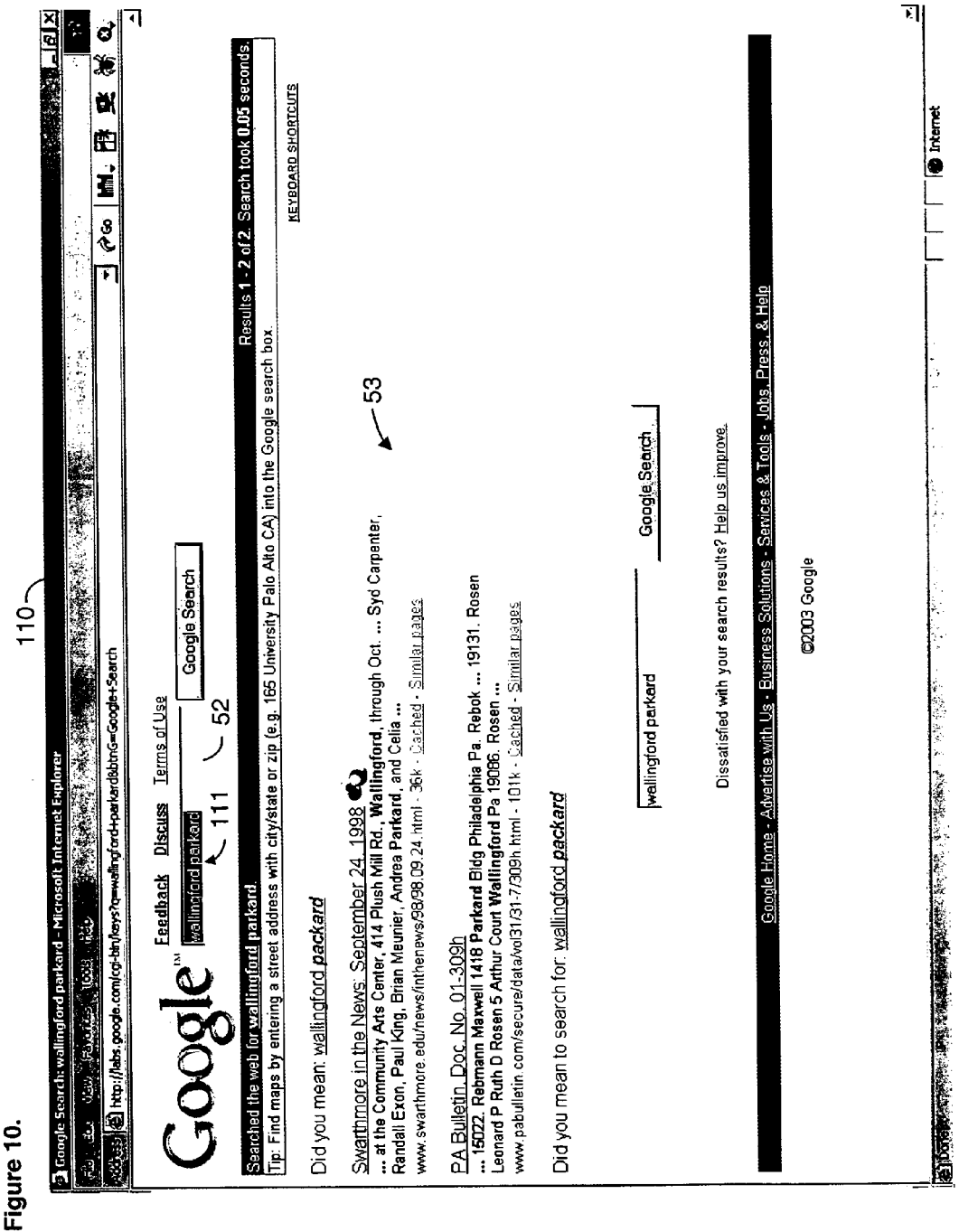
FIG. 10 is a screen shot showing, by way of example, a focus on a search box.

FIG. 10 is a screen shot 110 showing, by way of example, a focus 111 on a search box 52. Moving the focus 111 to the search box 52 enables a user to enter a textual query. In the described embodiment, the focus 111 is moved to the search box 52 when the 'A' key on the keyboard 33 is pressed when viewing the tabular Web page 53, described above with reference to FIG. 5.

Help Sheet

Figure 11:
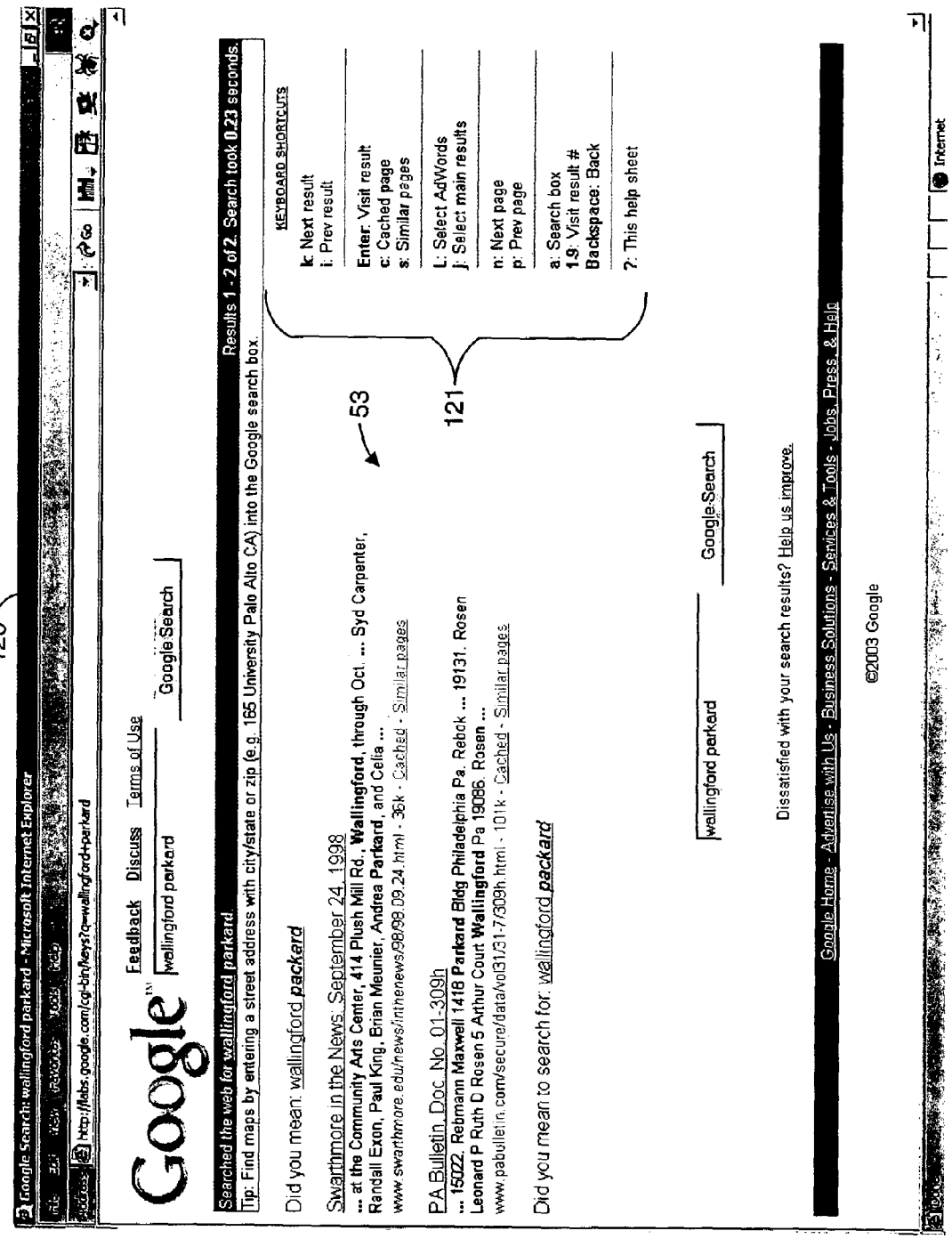
FIG. 11 is a screen shot showing, by way of example, a help sheet.

FIG. 11 is a screen shot 120 showing, by way of example, a help sheet 121. The help sheet 121 lists the available keyboard shortcuts. In the described embodiment, the help sheet 121 is selected when either the '?' or '/' key on the keyboard 33 is pressed when viewing the tabular Web page 53, described above with reference to FIG. 5.

Method Overview

Figure 12:
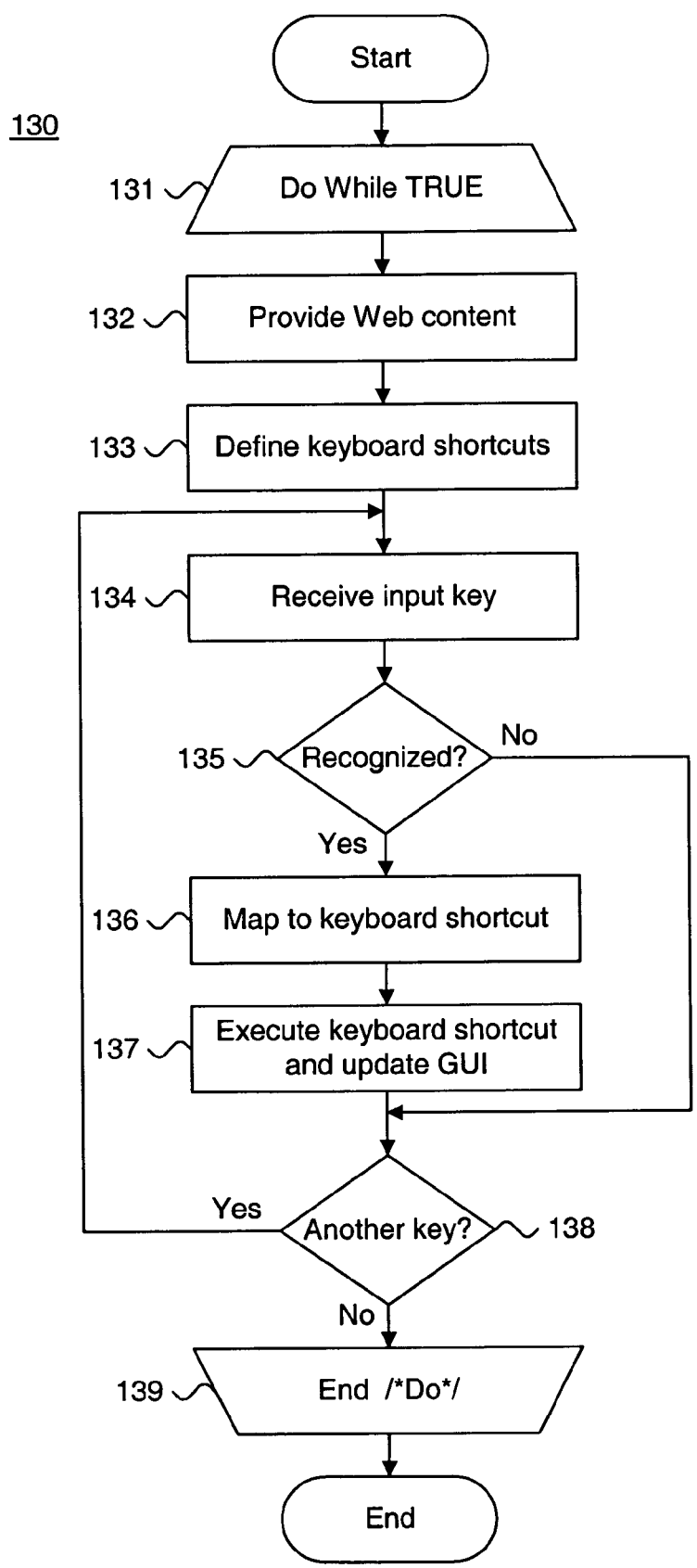
FIG. 12 is a flow diagram showing a method for navigating within a graphical user interface without using a pointing device, in accordance with the present invention.

FIG. 12 is a flow diagram showing a method 130 for navigating within a graphical user interface 37 without using a pointing device 34, in accordance with the present invention. The method 130 is described as a sequence of process operations or steps, which can be executed, for instance, by the Web browser 18 of FIG. 1, or equivalent component.

The method continuously processes input keys in an iterative processing loop (blocks 131-139) as follows. First, during each iteration (block 131), Web content is provided (block 132) as a Web page in a view on the graphical user interface 37, including a graphical pointer indicating a location within the view. Keyboard shortcuts are then defined for the Web content (block 133). In the described embodiment, the keyboard shortcuts are generated for selected hyperlinks within each Web page. Preferably, semantically-meaningful hyperlinks are selected, rather than selecting each hyperlink in spatial or source order. Intervening hyperlinks are skipped. The selection of semantically-meaningful hyperlinks is based on an evaluation of each Web page using semantic analysis methodologies, as is known in the art.

Subsequently, an input key is received on the keyboard 33 (block 134). If the input key is recognized as a keyboard shortcut (block 135), the input key is mapped to the applicable keyboard shortcut (block 136). The keyboard shortcut is then executed and the graphical user interface 37 is updated (block 137). The view of the Web page is updated relative to the graphical pointer by jumping, scrolling, retrieving, or displaying the Web page as indicated by the key selected. If another key is typed for the current Web page (block 138), processing continues with that input key (block 134). Otherwise, processing continues with the next Web page (block 139), after which the method terminates.

In the described embodiment, the Web browser 18 intercepts each input key and executes an appropriate action. For example, keyboard shortcuts that access or visit another Web page cause the Web browser 18 to generate Web content requests, which are sent to the Web server 20. Similarly, keyboard shortcuts that move the selection cause the Web browser 18 to highlight another selected Web page within the current Web page. Other forms of keyboard shortcut execution and graphical user interface updating could also be used, as would be recognized by one skilled in the art.

In addition, movement navigated to a selection within a Web page is accompanied by variable speed scrolling. Rather than jumping to the selection, the Web browser initially scrolls the Web page quickly and then scrolls the Web page slowly into the final scroll position. Thus, the Web browser provides the appearance of "slow-in," "slow-out" scrolling. In addition, repeatedly striking either the 'I' key or 'K' key, for example, also scrolls the Web page until the end of the Web page is reached. Upon reaching end of the Web page, striking either the 'I' key or 'K' key will cause the Web browser to fetch the next page of search results, thereby enabling the user to continue scanning search results without having to use a pointing device. Other forms of updating and scrolling, including variable and fixed speed scrolling and combinations of jumping and scrolling are possible, as would be recognized by one skilled in the art.

While the invention has been particularly shown and described as referenced to the embodiments thereof, those skilled in the art will understand that the foregoing and other changes in form and detail may be made therein without departing from the spirit and scope of the invention.

What is claimed is:

1. A system for navigating within a graphical user interface without using a pointing device, comprising:
   a set of one or more keyboard shortcuts comprising at least one key, each keyboard shortcut specifying an action to perform within a graphical user interface which is executed upon input of each key in the keyboard shortcut and at least one key corresponding to a semantically-meaningful hyperlink within Web content, wherein at least one of the one or more keyboard shortcuts causes scrolling of the Web content to occur and fetching of additional web content when scrolling reaches a predetermined location in the Web content, and further wherein the Web content comprises at least one intervening hyperlink, and the at least one key corresponding to the semantically-meaningful hyperlink providing navigation to skip selection of the at least one intervening hyperlink; and
   a Web browser providing navigation within the graphical user interface, comprising:
      an output component providing the Web content on a view within the graphical user interface and including a graphical pointer indicating a location within the view; and
      an input component intercepting at least one key input by a user and mapping the intercepted key to one keyboard shortcut, and executing the action specified by the keyboard shortcut and updating the view within the Web content relative to the graphical pointer.

2. A system according to claim 1, further comprising:
a scrolling component scrolling the view within the Web content in a direction indicated by the intercepted key.

3. A system according to claim 2, further comprising:
a control module scrolling to the view at variable speed.

4. A system according to claim 1, further comprising:
a fetching component fetching the Web content corresponding to one of a next or previous Web page in a direction indicated by the intercepted key.

5. A system according to claim 1, further comprising:
a display area defined on the graphical user interface receiving outputted visualized Web content.

6. A system according to claim 1, further comprising:
at least one of a display area defined on the graphical user interface and a user input region receiving inputted user inputs.

7. A system according to claim 6, further comprising:
a keyboard device receiving textual user inputs.

8. A system according to claim 1, further comprising:
navigational groups of keyboard shortcuts, comprising at least one of:
   a navigation group navigating to a selection within a Web page;
   a retrieval group retrieving a Web page;
   a caching group accessing at least one of a cached or similar Web page;
   a sequence group accessing a next or previous Web page in a sequence;
   a focus group moving a focus within the view to a user input region;
   an enumerated group accessing one or more enumerated Web pages;
   a hierarchy group accessing a previous Web page in a hierarchy; and
   a help group accessing a help Web page.

9. A method for navigating within a graphical user interface without using a pointing device, comprising:
   defining a set of one or more keyboard shortcuts comprising at least one key, each keyboard shortcut specifying an action to perform within a graphical user interface which is executed upon input of each key in the keyboard shortcut, at least one key corresponding to a semantically-meaningful hyperlink within Web content, and at least one key corresponding to a cached copy of a Web page associated with the semantically-meaningful hyperlink, the cached copy provided by a search engine, wherein at least one of the one or more keyboard shortcuts causes scrolling of the Web content to occur and fetching of additional web content when scrolling reaches a predetermined location in the Web content; and
   navigating within the graphical user interface, comprising:
      providing the Web content on a view within the graphical user interface and including a graphical pointer indicating a location within the view;
      intercepting at least one key input by a user and mapping the intercepted key to one keyboard shortcut; and
      executing the action specified by the keyboard shortcut and updating the view within the Web content relative to the graphical pointer.

10. A method according to claim 9, further comprising: scrolling the view within the Web content in a direction indicated by the intercepted key.

11. A method according to claim 10, further comprising: scrolling to the view at variable speed.

12. A method according to claim 9, further comprising: fetching the Web content corresponding to one of a next or previous Web page in a direction indicated by the intercepted key.

13. A method according to claim 9, further comprising: outputting visualized Web content within a display area defined on the graphical user interface.

14. A method according to claim 9, further comprising: inputting user inputs within at least one of a display area defined on the graphical user interface and a user input region.

15. A method according to claim 14, further comprising: receiving textual user inputs via a keyboard device.

16. A method according to claim 9, further comprising: defining navigational groups of keyboard shortcuts, comprising at least one of:
   navigating to a selection within a Web page;
   retrieving a Web page;
   accessing at least one of a cached or similar Web page;
   accessing a next or previous Web page in a sequence;
   moving a focus within the view to a user input region;
   accessing one or more enumerated Web pages;
   accessing a previous Web page in a hierarchy; and
   accessing a help Web page.

17. A computer-readable storage medium holding code for performing the method according to claim 9.

18. An apparatus for navigating within a graphical user interface without using a pointing device, comprising:
   means for defining a set of one or more keyboard shortcuts comprising at least one key, each keyboard shortcut specifying an action to perform within a graphical user interface which is executed upon input of each key in the keyboard shortcut and at least one key corresponding to a semantically-meaningful hyperlink within Web content, wherein at least one of the one or more keyboard shortcuts causes scrolling of the Web content to occur and fetching of additional web content when scrolling reaches a predetermined location in the Web content, and further wherein the Web content comprises at least one intervening hyperlink, and the at least one key corresponding to the semantically-meaningful hyperlink providing navigation to skip selection of the at least one intervening hyperlink; and
   means for navigating within the graphical user interface, comprising:
      means for providing the Web content on a view within the graphical user interface and including a graphical pointer indicating a location within the view;
      means for intercepting at least one key input by a user and mapping the intercepted key to one keyboard shortcut; and
      means for executing the action specified by the keyboard shortcut and updating the view within the Web content relative to the graphical pointer.

19. A system for providing keyboard-based graphical user interface navigation, comprising:
   a graphical user interface comprising an output area displaying Web content and a user input region receiving user keyboard inputs;
   a set of one or more keyboard shortcuts comprising at least one key available on a keyboard communicatively interfaced to the graphical user interface, each keyboard shortcut specifying an action to perform within the graphical user interface which is executed upon input of each key in the keyboard shortcut, at least one key corresponding to a semantically-meaningful hyperlink within the Web content, and at least one key corresponding to a cached copy of a Web page associated with the semantically-meaningful hyperlink, the cached copy provided by a search engine, wherein at least one of the one or more keyboard shortcuts causes scrolling of the Web content to occur and fetching of additional web content when scrolling reaches a predetermined location in the Web content; and
   a Web browser interpreting keyboard shortcuts received from a user to navigate within the output area of the graphical user interface, comprising:
      a view defined within the output area of the graphical user interface providing the Web content;
      a graphical pointer navigable maintained within the output area and indicating a location within the view of the Web content; and
      a keyboard shortcut module intercepting at least one key input by a user and mapping the intercepted key to one keyboard shortcut, and executing the action specified by the keyboard shortcut and updating the view within the Web content relative to the graphical pointer.

20. A system according to claim 19, further comprising: at least one keyboard shortcut navigating to a selection within a Web page responsive to the intercepted key.

21. A system according to claim 19, further comprising: at least one keyboard shortcut retrieving a Web page responsive to the intercepted key.

22. A system according to claim 19, further comprising: at least one keyboard shortcut accessing at least one of a cached or similar Web page responsive to the intercepted key.

23. A system according to claim 19, further comprising: at least one keyboard shortcut accessing a next or previous Web page in a sequence responsive to the intercepted key.

24. A system according to claim 19, further comprising: at least one keyboard shortcut moving a focus within the view to a user input region.

25. A system according to claim 19, further comprising: at least one keyboard shortcut accessing one or more enumerated Web pages responsive to the intercepted key.

26. A system according to claim 19, further comprising: at least one keyboard shortcut accessing a previous Web page in a hierarchy responsive to the intercepted key.

27. A system according to claim 19, further comprising: at least one keyboard shortcut accessing a help Web page responsive to the intercepted key.

28. A method for providing keyboard-based graphical user interface navigation, comprising:
   providing a graphical user interface comprising an output area displaying Web content and a user input region receiving user keyboard inputs;
   defining a set of one or more keyboard shortcuts comprising at least one key available on a keyboard communicatively interfaced to the graphical user interface, each keyboard shortcut specifying an action to perform within the graphical user interface which is executed upon input of each key in the keyboard shortcut and at least one key corresponding to a semantically-meaningful hyperlink within the Web content, wherein at least one of the one or more keyboard shortcuts causes scrolling of the Web content to occur and fetching of additional web content when scrolling reaches a predetermined location in the Web content and further wherein the Web content comprises at least one intervening hyperlink, and the at least one key corresponding to the semantically-meaningful hyperlink providing navigation to skip selection of the at least one intervening hyperlink; and interpreting keyboard shortcuts received from a user to navigate within the output area of the graphical user interface, comprising:

providing the Web content on a view within the output area of the graphical user interface;

maintaining a graphical pointer navigable within the output area and indicating a location within the view of the Web content;

intercepting at least one key input by a user and mapping the intercepted key to one keyboard shortcut; and executing the action specified by the keyboard shortcut and updating the view within the Web content relative to the graphical pointer.

29. A method according to claim 28, further comprising:
navigating to a selection within a Web page responsive to the intercepted key.

30. A method according to claim 28, further comprising:
retrieving a Web page responsive to the intercepted key.

31. A method according to claim 28, further comprising:
accessing at least one of a cached or similar Web page responsive to the intercepted key.

32. A method according to claim 28, further comprising:
accessing a next or previous Web page in a sequence responsive to the intercepted key.

33. A method according to claim 28, further comprising:
moving a focus within the view to a user input region.

34. A method according to claim 28, further comprising:
accessing one or more enumerated Web pages responsive to the intercepted key.

35. A method according to claim 28, further comprising:
accessing a previous Web page in a hierarchy responsive to the intercepted key.

36. A method according to claim 28, further comprising:
accessing a help Web page responsive to the intercepted key.

37. A computer-readable storage medium holding code for performing the method according to claim 28.

38. An apparatus for providing keyboard-based graphical user interface navigation, comprising:

means for providing a graphical user interface comprising an output area displaying Web content and a user input region receiving user keyboard inputs;

means for defining a set of one or more keyboard shortcuts comprising at least one key available on a keyboard communicatively interfaced to the graphical user interface, each keyboard shortcut specifying an action to perform within the graphical user interface which is executed upon input of each key in the keyboard shortcut, at least one key corresponding to a semantically-meaningful hyperlink within the Web content, and at least one key corresponding to a cached copy of a Web page associated with the semantically-meaningful hyperlink, the cached copy provided by a search engine, wherein at least one of the one or more keyboard shortcuts causes scrolling of the Web content to occur and fetching of additional web content when scrolling reaches a predetermined location in the Web content; and means for interpreting keyboard shortcuts received from a user to navigate within the output area of the graphical user interface, comprising:

means for providing the Web content on a view within the output area of the graphical user interface;

means for maintaining a graphical pointer navigable within the output area and indicating a location within the view of the Web content;

means for intercepting at least one key input by a user and mapping the intercepted key to one keyboard shortcut; and means for executing the action specified by the keyboard shortcut and updating the view within the Web content relative to the graphical pointer.

* * * * *